United States Patent [19] [11] 3,898,212
Wade et al. [45] Aug. 5, 1975

[54] TRIAZINO(4,3-D) (1,4) BENZODIAZEPINE-3,4,7-TRIONES
[75] Inventors: Peter C. Wade, Pennington, N.J.; B. Richard Vogt, Yardley, Pa.
[73] Assignee: E. R. Squibb & Sons, Inc., Princeton, N.J.
[22] Filed: Aug. 9, 1974
[21] Appl. No.: 495,970

[52] U.S. Cl. .......................... 260/239.3 T; 424/249
[51] Int. Cl.² ........................................ C07d 471/04
[58] Field of Search ........................... 260/239.3 T Primary Examiner—Henry R. Jiles
Assistant Examiner—Robert T. Bond
Attorney, Agent, or Firm—Lawrence S. Levinson; Merle J. Smith; Donald J. Barrack

[57] ABSTRACT
Compounds having the structure

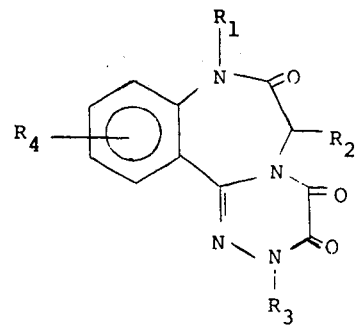

wherein $R_1$ is hydrogen, alkyl, phenyl, or phenylmethyl; $R_2$ is hydrogen or alkyl; $R_3$ is alkyl or arylalkyl; and $R_4$ is hydrogen, halogen, nitro, cyano, trifluoromethyl, alkyl, aldoxy, or alkylthio have antiinflammatory activity.

6 Claims, No Drawings

TRIAZINO(4,3-D) (1,4) BENZODIAZEPINE-3,4,7-TRIONES

SUMMARY OF THE INVENTION

Compounds having the structure

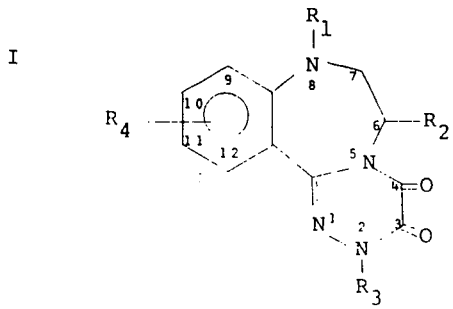

are anti-inflammatory agents.

In formula I, and throughout the specification, the symbols are as defined below:

$R_1$ can be hydrogen, alkyl, phenyl, or phenylmethyl;
$R_2$ can be hydrogen or alkyl;
$R_3$ can be alkyl or arylalkyl; and
$R_4$ can be hydrogen, halogen (preferably fluorine, chlorine or bromine), nitro, cyano, trifluoromethyl, alkyl, alkoxy, or alkylthio.

The term "alkyl" as used throughout the specification, either by itself or as part of a larger group, refers to both straight and branched chain alkyl groups containing one, two, three, or four carbon atoms.

The term "alkoxy" as used throughout the specification, refers to compounds of the formula Y—O— wherein Y is alkyl as defined above.

The term "halogen" as used throughout the specification, refers to fluorine, chlorine, bromine, and iodine.

The term "arylalkyl" as used throughout the specification refers to an alkyl group substituted with phenyl or phenyl having one or two substituents selected from alkyl, alkoxy and halogen.

DETAILED DESCRIPTION OF THE INVENTION

The novel compounds of this invention are produced from compounds having the formula

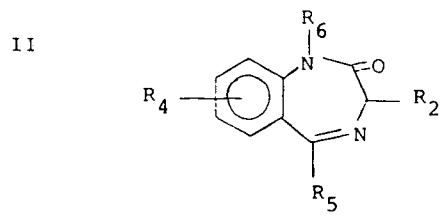

wherein $R_5$ can be halogen (preferably bromine or chlorine), sulfhydryl, alkoxy, alkylthio, or phenylalkylthio and $R_6$ can be alkyl, phenyl, or phenylmethyl. The compounds of formula II are known; see, for example, U.S. Pat. No. 3,414,563 and Swiss Pat. No. 485,742.

Reaction of a benzodiazepine of formula II with 4-morpholineglyoxylic acid, hydrazide

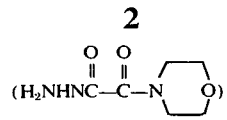

yields a compound having the structure

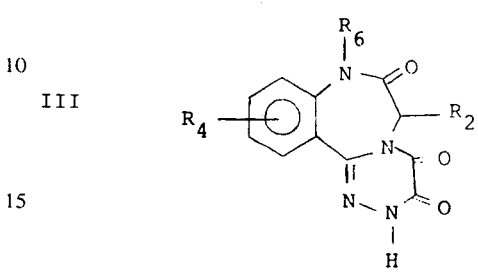

The reaction can be run in a non-reactive polar solvent, e.g., dimethylformamide, n-butanol, etc. at a temperature of about 50°C to 200°C, for about 5 minutes to 24 hours, preferably at from 60°C to 150°C for 10 minutes to 3 hours. The benzodiazepine of formula II and 4-morpholineglyoxylic acid, hydrazide are reacted in approximately a 1:1 molar ratio.

Alternatively, compounds of formula III can be prepared by first reacting a benzodiazepine of formula II with a carbazate having the formula

wherein Z is t-butyl, phenylmethyl, or phenylmethyl substituted with one or more alkoxy or nitro groups, to yield an intermediate having the structure

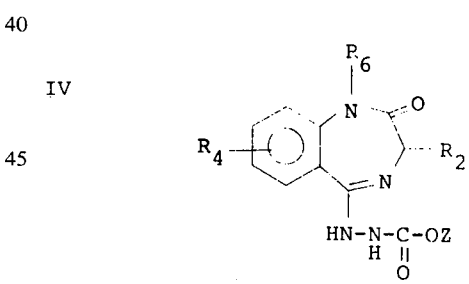

Reaction of a compound of formula IV with an ester of oxalic acid and an alkanol (preferably a lower alcohol having one, two, or three carbons) and an anhydrous acid (preferably oxalic acid) yields the corresponding compound of formula III. The reaction can be run without a solvent or in a non-reacting organic solvent at a temperature of from about 50°C to 250°C for about 5 minutes to 24 hours, preferably from about 60°C to 150°C for about 30 minutes to 6 hours. The benzodiazepine of formula II, the oxalic acid ester, and the strong acid are used in approximately a 1:1:1 molar ratio.

In order to obtain the triazinobenzodiazepines of formula I, a triazinobenzodiazepine of formula III is reacted with an appropriate base, e.g., thallous ethoxide, in approximately a 1:1 molar ratio, to obtain a salt having the structure

V

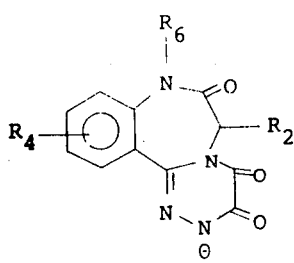

The salt of formula V is subsequently reacted with a compound having the formula $R_3$—X wherein X can be chlorine, bromine, iodine, alkylsulfonate (e.g., methanesulfonate) or arylsulfonate (e.g., toluenesulfonate), to obtain a compound having the structure

VI

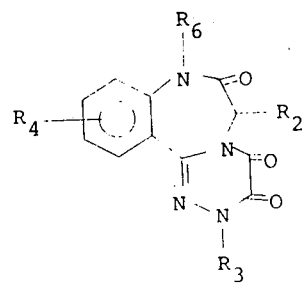

The reaction of a triazinobenzodiazepine of formula III with thallous ethoxide is run in a non-reactive polar solvent, e.g., dimethylformamide at a temperature of from 0°C to 180°C, preferably room temperature, for a period of about 1 minute to 5 hours, preferably for 10 minutes to 1 hour. The reaction of a salt of formula V with a compound of the structure $R_3$—X is run at about 50°C to 200°C for a period of about 30 minutes to 48 hours, preferably at 80°C to 140°C for 2 to 24 hours.

Reduction of triazinobenzodiazepines of formula VI, wherein $R_6$ is benzyl, to yield compounds having the structure

VII

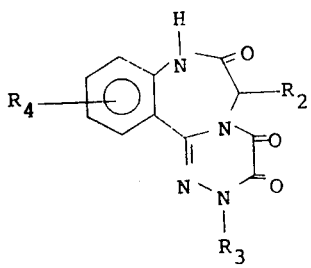

can be accomplished by reacting the compound with hydrogen under pressure in the presence of a catalyst, e.g., palladium or Raney nickel, or by reacting the compound with anhydrous, liquid hydrofluoric acid.

Compounds of formula I wherein $R_2$ is hydrogen are preferred.

Compounds of formula I wherein $R_4$ is in the 10- or 11-position are preferred, and those wherein $R_4$ is in the 11-position are particularly preferred. Compounds of formula I wherein $R_4$ is halogen are preferred, chlorine being the most preferred.

The triazinobenzodiazepines of formula I are useful in treating inflammation in mammalian species, e.g., rats, dogs, cats, monkeys, etc. Joint tenderness and stiffness (in conditions such as rheumatoid arthritis) are relieved by the above described compounds.

The compounds of this invention are formulated for use as anti-inflammatory agents according to accepted pharmaceutical practice in oral dosage forms such as tablets, capsules, elixirs, or powders, or in an injectable form in a sterile aqueous vehicle prepared according to conventional pharmaceutical practice. The compounds of this invention may be administered in amounts of 100 mg/70kg/day to 2 g/70kg/day, perferably 100 mg/70kg/day to 1 g/70kg/day.

The following examples are specific embodiments of this invention.

EXAMPLE 1—
11-Chloro-2,8-dihydro-8-methyl-2-(phenylmethyl)-as-triazino[4,3-d][1,4]benzodiazepine-3,4,7(6H)-trione A.
11-Chloro-2,8-dihydro-8-methyl-as-triazino[4,3-d]-[1,4]benzodiazepine-3,4,7(6H)-trione 5,7-Dichloro-1-methyl-1,4-benzodiazepinone-2 (20 grams, 0.08 moles) and 4-morpholineglyoxylic acid, hydrazide (15 grams, 0.088 mole) are mixed together in 300 milliliters of dimethylformamide for 30 minutes while heating at 100°C. The solvent is stripped off and 400 milliliters of absolute ethanol is added to the residue. A precipitate forms and the mixture is stirred overnight. The precipitate is filtered off and stirred in 200 milliliters of water for 2 hours at room temperature. The solid material is filtered off and digested for 1 hour as a slurry in 2 liters of absolute ethanol. While still hot, the mixture is filtered and 11-chloro-2,8-dihydro-8-methyl-as-triazino[4,3-d][1,4]benzodiazepine-3,4,7(6H)-trione (the filter cake) is dried under vacuum at 120°C for 4 hours. The product has an indistinct melting point; partial melting and decomposition occur from 342°C to 365°C, where complete melting and decomposition occur.

B.
11-Chloro-2,8-dihydro-8-methyl-2-(phenylmethyl)-as-triazino[4,3-d][1,4]benzodiazepine-3,4,7(6H)-trione 11-Chloro-2,8-dihydro-8-methyl-as-triazino[4,3-d][1,4]benzodiazepine-3,4,7(6H)-trione (2.93 grams, 0.01 mole) is dissolved in 50 milliliters of warm (ca. 70°C) dimethylformamide and treated with thallous ethoxide (2.04 grams, 0.01 mole). After stirring at 25°C for 2 hours, the solution is diluted with 75 ml of ether and the resulting precipitate filtered off. The precipitate is dried at 25°C for 2 hours and then suspended in 100 milliliters of refluxing toluene and treated with benzyl bromide (4 grams, 0.022 mole). Refluxing is continued for 3 hours. The hot reaction mixture is filtered through infusorial earth and the filtrate is stripped of solvent. The residue is taken up in chloroform and washed through a 5 × 10 cm. column of magnesium silicate with 1 liter of chloroform:ethyl acetate (6:4). The solvents are stripped off and the residue recrystallized from ethanol: chloroform (5:1) to give 2.2 grams of the title compound, melting point 241°–243°C.

EXAMPLE 2—

11-Chloro-2,8-dihydro-2,8-dimethyl-as-triazino[4,3-d][1,4]benzodiazepine-3,4,7(6H)-trione 11-Chloro-2,8-dihydro-8-methyl-as-triazino[4,3-d][1,4]benzodiazepine-3,4,7(6H)-trione (3.54 grams, 0.012 mole, prepared as described in Example 1) is dissolved in 30 milliliters of warm (ca 70°C) dimethylformamide and treated with thallous ethoxide (2.46 grams, 0.012 mole). The solution is stirred at 25°C for 2 hours and then diluted with 75 milliliters of ether; the resulting precipitate is filtered off. The precipitate is dried at 25°C for 2 hours and then suspended in methyl iodide (50 milliliters) and refluxed for 6 hours. The methyl iodide is allowed to evaporate and the residue extracted in a Soxhlet with chloroform. The resulting chloroform solution (ca. 400 milliliters) is washed through a column of 60 grams of magnesium silicate with 2 liters of chloroform. The solvent is removed under vacuum and the residue stirred as a suspension in 100 milliliters of methanol for 1 hour. The insoluble material is filtered off and dried overnight at 80°C to give 1.0 gram of the title compound, melting point 350°–353°C. An additional 1.5 grams of less pure material is recovered from the column.

EXAMPLES 3 –11

Following the procedure of Example 1, but substituting the compounds indicated in column I below for 5,7-dichloro-1-methyl-1,4-benzodiazepinone-2, the compounds indicated in column II are obtained.

| Example | Column I | Column II |
| --- | --- | --- |
| 3 | 5-chloro-1-(phenylmethyl)-7-(trifluoromethyl)-1,4-benzodiazepinone-2 | 2,8-dihydro-2,8-[di-(phenylmethyl)]-11-(trifluoromethyl)-as-triazino[4,3-d]-[1,4]benzodiazepine-3,4,7(6H)-trione |
| 4 | 5-chloro-1-methyl-7-nitro-1,4-benzodiazepinone-2 | 2,8-dihydro-8-methyl-11-nitro-2-(phenylmethyl)-as-triazino[4,3-d][1,4]benzodiazepine-3,4,7(6H)-trione |
| 5 | 5-chloro-7-ethylthio-1-methyl-1,4-benzodiazepinone-2 | 2,8-dihydro-8-methyl-11-(ethylthio)-2-(phenylmethyl)-as-triazino[4,3-d][1,4]-benzodiazepine-3,4,7(6H)-trione |
| 6 | 5-chloro-1,7-dimethyl-1,4-benzodiazepinone-2 | 2,8-dihydro-8,11-dimethyl-2-(phenylmethyl)-as-triazino[4,3-d][1,4]benzodiazepine-3,4,7(6H)-trione |
| 7 | 5-chloro-1,3-dimethyl-7-(trifluoromethyl)-1,4-benzodiazepinone-2 | 2,8-dihydro-6,8-dimethyl-2-(phenylmethyl)-11-(trifluoromethyl)-as-triazino[4,3-d]-[1,4]benzodiazepine-3,4,7(6H)-trione |
| 8 | 8-bromo-5-ethoxy-1-phenyl-1,4-benzodiazepinone-2 | 10-bromo-2,8-dihydro-8-phenyl-2-(phenylmethyl)-as-triazino[4,3-d][1,4]benzodiazepine-3,4,7(6H)-trione |
| 9 | 7-cyano-1-(phenylmethyl)-5-methylthio)-1,4-benzodiazepinone-2 | 11-cyano-2,8-dihydro-2,8-[di-(phenylmethyl)]-as-triazino[4,3-d][1,4]benzodiazepine-3,4,7(6H)-trione |
| 10 | 1-phenylmethyl-7-chloro-1,4-benzodiazepin-2-one-5-thione | 11-chloro-2,8-dihydro-2,8-[di-(phenylmethyl)]-as-triazino[4,3-d][1,4]benzodiazepine-3,4,7(6H)-trione |
| 11 | 5-chloro-1-phenyl-7-ethyl-1,4-benzodiazepinone-2 | 8-phenyl-11-ethyl-2,8-dihydro-2-(phenylmethyl)-as-triazino[4,3-d][1,4]benzodiazepine-3,4,7(6H)-trione |

EXAMPLES 12 –20

Following the procedure of Example 1, but substituting the compounds indicated in column I below for benzyl bromide, the compounds indicated in column II are obtained.

| Example | Column I | Column II |
| --- | --- | --- |
| 12 | 4-bromo-1-phenylbutane | 11-chloro-2,8-dihydro-8-methyl-2-(4-phenylbutyl)-as-triazino[4,3-d][1,4]benzodiazepine-3,4,7(6H)-trione |
| 13 | 3-bromo-1-(2-chlorophenyl)butane | 11-chloro-2,8-dihydro-8-methyl-2-[3-(2-chlorophenyl)-1-methylpropyl]-as-triazino[4,3-d][1,4]benzodiazepine-3,4,7(6H)-trione |
| 14 | 2-bromo-1-phenylbutane | 11-chloro-2,8-dihydro-8-methyl-2-[1-(phenylmethyl)propyl]-as-triazino[4,3-d][1,4]benzodiazepine-3,4,7(6H)-trione |
| 15 | 2-bromo-1-(3,4-dichlorophenyl)ethane | 11-chloro-2,8-dihydro-8-methyl-2-[2-(3,4-dichlorophenyl)ethyl]-as-triazino[4,3-d][1,4]-benzodiazepine-3,4,7(6H)-trione |
| 16 | 3-bromo-1-(2-methoxyphenyl)propane | 11-chloro-2,8-dihydro-8-methyl-2-[3-(2-methoxyphenyl)propyl]-as-triazino[4,3-d][1,4]-benzodiazepine-3,4,7(6H)-trione |
| 17 | 2-bromo-1-(3,5-dimethylphenyl)ethane | 11-chloro-2,8-dihydro-8-methyl-2-[2-(3,5-dimethylphenyl)ethyl]-as-triazino[4,3-d][1,4]-benzodiazepine-3,4,7(6H)-trione |
| 18 | 4-fluorophenylmethyl bromide | 11-chloro-2,8-dihydro-8-methyl-2-(4-fluorophenylmethyl)-as-triazino[4,3-d][1,4]benzodiazepine-3,4,7(6H)-trione |
| 19 | 1-bromo-2-methylpropane | 11-chloro-2,8-dihydro-8-methyl-2-(2-methylpropyl)-as-triazino[4,3-d][1,4]benzodiazepine-3,4,7(6H)-trione |
| 20 | 2-bromopropane | 11-chloro-2,8-dihydro-8-methyl-2-(1-methylethyl)-as-triazino[4,3-d][1,4]benzodiazepine-3,4,7(6H)-trione |

EXAMPLE 21 —

11-Chloro-2,8-dihydro-2-methyl-as-triazino[4,3-d][1,4]benzodiazepine-3,4,7(6H)-trione

A.

11-Chloro-2,8-dihydro-8-(phenylmethyl)-as-triazino[4,3-d][1,4]benzodiazepine-3,4,7(6H)-trione

EXAMPLES 22 –26

Following the procedure of Example 21, but substituting the compound indicated in column I below for 5,7-dichloro-1-benzyl-1,4-benzodiazepinone-2 and the compound indicated in column II below for methyl iodide, the compound indicated in column III below is obtained.

| Example | Column I | Column II | Column III |
|---|---|---|---|
| 22 | 5-chloro-7-nitro-1-benzyl-1,4-benzodiazepinone-2 | 3-bromo-1-(3,4-dichlorophenyl)propane | 11-nitro-2,8-dihydro-2-[3-(3,4-dichlorophenyl)propyl]-as-triazino[4,3-d][1,4]benzodiazepine-3,4,7(6H)-trione |
| 23 | 5-chloro-8-methoxy-1-benzyl-1,4-benzodiazepinone-2 | 2-bromopropane | 10-methoxy-2,8-dihydro-2-(1-methylethyl)-as-triazino[4,3-d]-[1,4]benzodiazepine-3,4,7(6H)-trione |
| 24 | 5-chloro-3,7-diethyl-1-benzyl-1,4-benzodiazepinone-2 | bromoethane | 2,6,11-triethyl-2,8-dihydro-as-triazino[4,3-d][1,4]benzodiazepine-3,4,7(6H)-trione |
| 25 | 5-chloro-7-ethylthio-1-benzyl 1,4-benzodiazepinone-2 | 2-bromo-1-(3-chlorophenyl)ethane | 11-(ethylthio)-2,8-dihydro-2-[2-(chlorophenyl)ethyl]-as-triazino-[4,3-d][1,4]benzodiazepine-3,4,7-(6H)-trione |
| 26 | 5-chloro-7-(trifluoromethyl)-1-benzyl-1,4-benzodiazepinone-2 | 4-bromo-1-(2-methoxyphenyl)butane | 11-trifluoromethyl)-2,8-dihydro-2-[4-(2-methoxyphenyl)-butyl]-as-triazino[4,3-d][1,4]-benzodiazepine-3,4,7(6H)-trione |

5,7-Dichloro-1-benzyl-1,4-benzodiazepinone-2 (0.10 moles) and 4-morpholineglyoxylic acid, hydrazide (0.11 mole) are mixed together in 400 milliliters of dimethylformamide for 30 minutes while heating at 100°C to yield 11-chloro-2,8-dihydro-8-(phenylmethyl)-as-triazino[4,3-d][1,4]benzodiazepine-3,4,7(6H)-trione.

B.

11-Chloro-2,8-dihydro-8-(phenylmethyl)-2-methyl-as-triazino[4,3-d][1,4]benzodiazepine-3,4,7(6H)-trione 11-Chloro-2,8-dihydro-8-(phenylmethyl)-as-triazino [4,3-d][1,4]benzodiazepine-3,4,7(6H)-trione (0.02 mole) is suspended in 100 milliliters of tetrahydrofuran Thallous ethoxide (0.02 mole) is added to the suspension and stirred for 1 hour at room temperature to give the salt.

The salt is suspended in 200 milliliters of refluxing toluene and treated with methyl iodide. Refluxing is continued for 3 hours followed by filtering of the hot solution, evaporation of the filtrate, washing of the residue and recrystallizing of 11-chloro-2,8-dihydro-8-(phenylmethyl)-2-methyl-as-triazino[4,3-d][1,4]benzodiazepine-3,4,7(6H)-trione.

C.

11-Chloro-2,8-dihydro-2-methyl-as-triazino[4,3-d]-[1,4]benzodiazepine-3,4,7(6H)-trione 11-Chloro-2,8-dihydro-8-(phenylmethyl)-2-methyl-as-triazino[4,3-d][1,4]benzodiazepine-3,4,7(6H)-trione (0.01 mole) is hydrogenated at 60°C in 300 milliliters of acetic acid containing 0.3 g of pre-reduced Raney nickel. The initial hydrogen pressure is 60 p.s.i. The reduction is stopped after 0.01 mole of hydrogen is absorbed, the catalyst is filtered off, and the solvent is evaporated. The residue is stirred with water and 11-chloro-2,8-dihydro-2-methyl-as-triazino[4,3-d][1,4]benzodiazepine-3,4,7(6H)-trione is filtered off and dried.

What is claimed is:

1. A compound having the formula

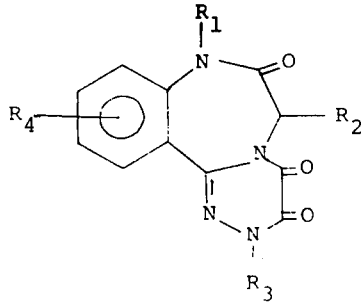

wherein $R_1$ is hydrogen, alkyl, phenyl or phenylmethyl; $R_2$ is hydrogen or alkyl; $R_3$ is alkyl or arylalkyl; and $R_4$ is hydrogen, halogen, nitro, cyano, trifluoromethyl, alkyl, alkoxy or alkylthio; wherein alkyl refers to alkyl groups having one to four carbon atoms, alkoxy refers to alkoxy groups having one to four carbon atoms, and arylalkyl refers to an alkyl group substituted with phenyl or phenyl having one or two alkyl, alkoxy or halogen substituents.

2. A compound in accordance with claim 1 wherein $R_3$ is alkyl.

3. A compound in accordance with claim 1 wherein $R_3$ is phenylalkyl.

4. A compound in accordance with claim 3 wherein $R_3$ is phenylmethyl or phenylethyl.

5. The compound in accordance with claim 1 having the name 11-chloro-2,8-dihydro-8-methyl-2-(phenylmethyl)-as-triazino[4,3-d][1,4]benzodiazepine-3,4,7(6H)-trione.

6. The compound in accordance with claim 1 having the name 11-chloro-2,8-dihydro-2,8-dimethyl-as-triazino[4,3-d][1,4]benzodiazepine-3,4,7(6H)-trione.

* * * * *

UNITED STATES PATENT AND TRADEMARK OFFICE
CERTIFICATE OF CORRECTION

PATENT NO. : 3,898,212
DATED : August 5, 1975
INVENTOR(S) : Peter C. Wade and B. Richard Vogt It is certified that error appears in the above-identified patent and that said Letters Patent are hereby corrected as shown below:

Abstract page, second to last line, "aldoxy" should read --alkoxy--.

Signed and Sealed this eleventh Day of November 1975

[SEAL]

Attest:

RUTH C. MASON
Attesting Officer

C. MARSHALL DANN
Commissioner of Patents and Trademarks